United States Patent
Gaydos

(12) 
(10) Patent No.: US 6,431,084 B1
(45) Date of Patent: Aug. 13, 2002

(54) RAILROAD HOPPER CAR GATE ASSEMBLY AND METHOD OF OPERATING SAME

(75) Inventor: Christopher C. Gaydos, St. Charles, IL (US)

(73) Assignee: Miner Enterprises, Inc., Geneva, IL (US)

( * ) Notice: Subject to any disclaimer, the term of this patent is extended or adjusted under 35 U.S.C. 154(b) by 0 days.

(21) Appl. No.: 09/746,962

(22) Filed: Dec. 21, 2000

(51) Int. Cl.⁷ .................................................. B61D 3/00
(52) U.S. Cl. ........................................ 105/247; 105/240
(58) Field of Search ................................ 105/247, 240, 105/241.1

(56) References Cited

U.S. PATENT DOCUMENTS

| | | | |
|---|---|---|---|
| 3,191,944 A | 6/1965 | Watts | |
| 3,446,373 A | 5/1969 | Keister, Jr. | |
| 4,009,664 A | 3/1977 | Feron | 105/239 |
| 4,280,778 A * | 7/1981 | Knippel | 414/387 |
| 4,454,822 A | 6/1984 | Fischer | 105/250 |
| 5,163,372 A * | 11/1992 | Galvan et al. | 105/240 |
| 5,284,097 A | 2/1994 | Peppin et al. | 105/311.1 |
| 5,311,822 A | 5/1994 | Bounds | 105/311.1 |
| 5,359,942 A * | 11/1994 | Ward | 105/240 |
| 5,423,268 A | 6/1995 | Bounds | 105/311.1 |
| 5,657,700 A * | 8/1997 | Bounds | 105/311.1 |

OTHER PUBLICATIONS

Copyright 1982; pp. 1 through 36 Warner Electric catalog entitled "Electrak Linear Actuator Systems".

* cited by examiner

Primary Examiner—S. Joseph Morano
Assistant Examiner—Robert J. McCarry, Jr.
(74) Attorney, Agent, or Firm—John W. Harbst

(57) ABSTRACT

A railroad hopper car gate assembly is disclosed. The gate assembly includes a frame configured for attachment to a hopper body of a railroad hopper car in material receiving relation relative to an outlet on the railroad car and defines at least one discharge opening. A door assembly is mounted on the frame for generally vertical sliding movements between open and closed positions relative to the discharge opening on said frame. A driver is operably coupled between the frame and the door assembly for selectively effecting sliding movements of the door assembly relative to said discharge opening between the open and closed positions. The driver develops up to a 2000 lb. opening force on the door assembly and a speed up to about 2.1 inches per second as the door assembly moves from the closed position to the open position and includes a direct current electric motor which draws less than about 30 amperes from a power source as the door assembly is moved from the closed position to the open position. A method for operating the gate assembly is also disclosed.

39 Claims, 8 Drawing Sheets

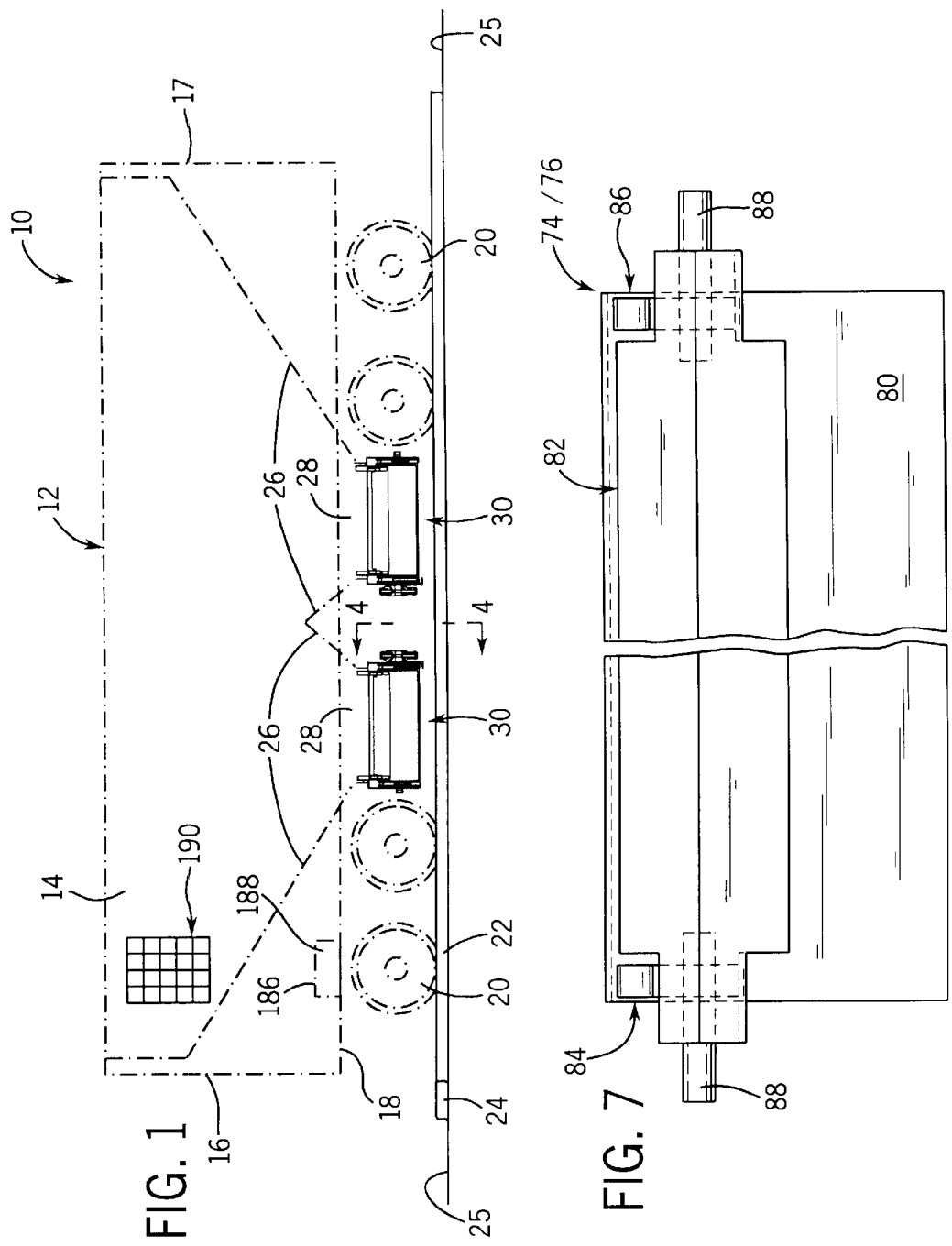

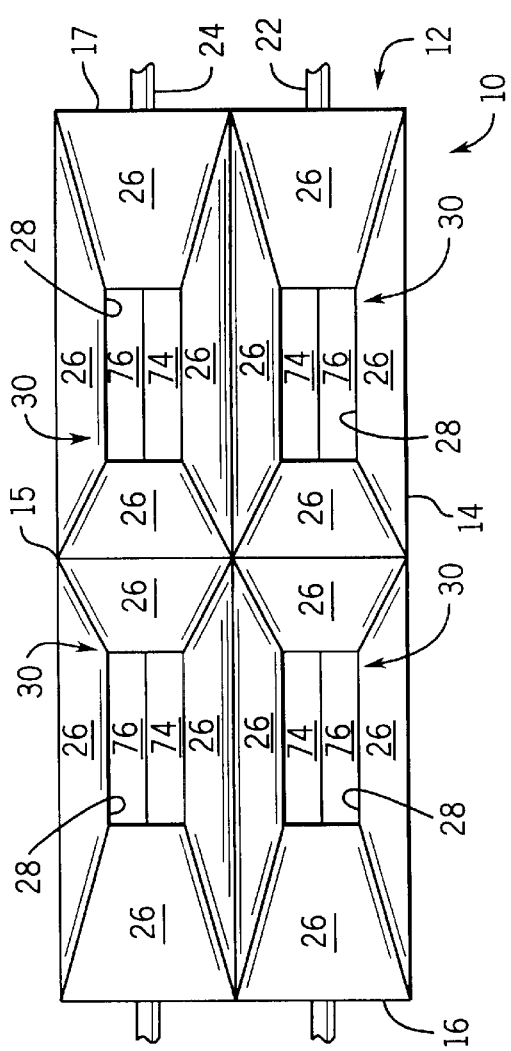
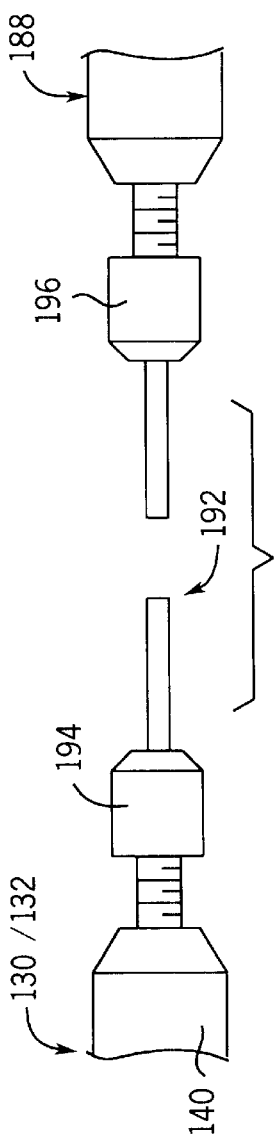
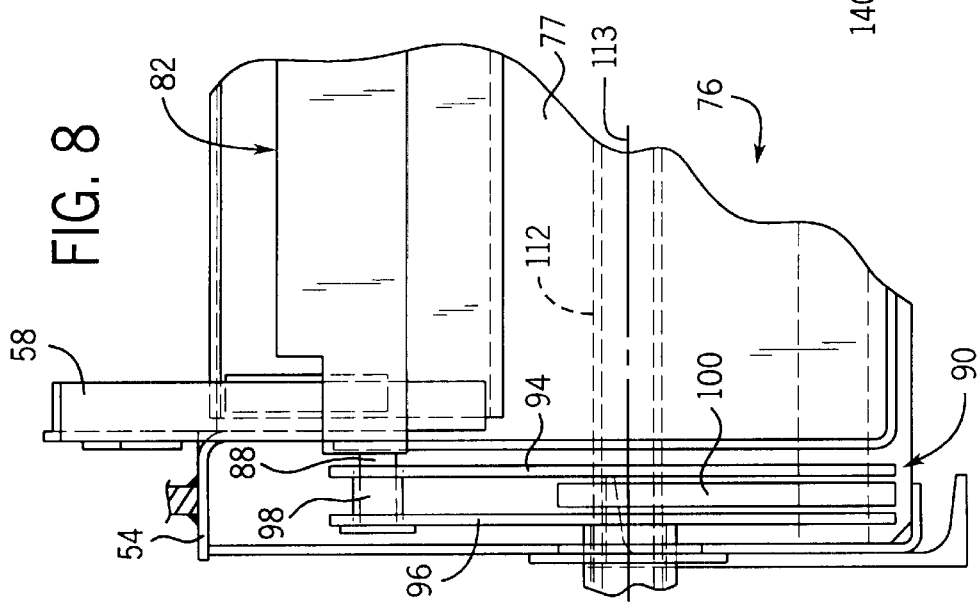

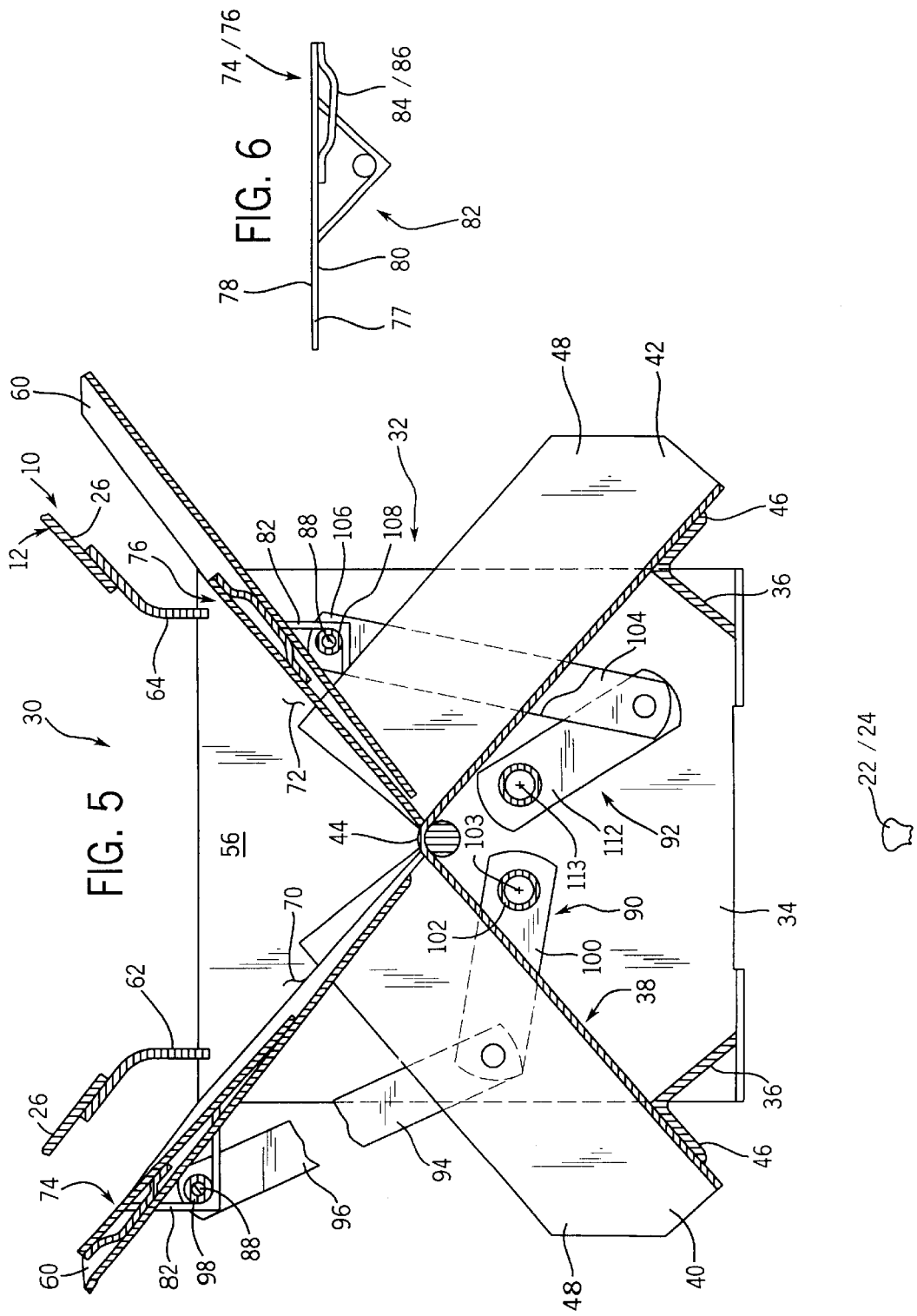

RAILROAD HOPPER CAR GATE ASSEMBLY AND METHOD OF OPERATING SAME

FIELD OF THE INVENTION

The present invention generally relates to railroad hopper cars and, more specifically, to a gate assembly which is attachable to a body of a railroad hopper car to selectively control the discharge of ballast in the railroad hopper car to a railbed below. A method for operating the gate assembly is also disclosed.

FIELD OF THE INVENTION

Gate assemblies allowing for unloading of ballast from railroad hopper cars are well known in the art. Such gate assemblies are typically arranged to opposite sides of the longitudinal centerline of the railroad hopper car and lengthwise along a bottom of the hopper car. Moreover, it is common to design each gate assembly such that ballast can be selectively distributed from the railcar to one or the other or both sides of the rails along which the railcar travels. In this regard, a frame of each gate assembly defines inner and outer outlets from which ballast can be discharged from the hopper car. The gate assembly furthermore includes door assemblies arranged in operable combination with the outlets to selectively control the discharge of ballast from the hopper car as a function of the disposition of the door assembly relative to the respective outlet.

Some such gate assemblies employ manually actuated door opening and closing devices. That is, by manually rotating a handle, as with an elongated steel bar or the like, and through a linkage, each door assembly is moved between open and closed positions. Thus, a control opening on each side of the gate assembly and through which the ballast is discharged must be set by hand when the train is stationary. Alternatively, operators, on each side of the railcar, and for each door assembly, initially set the control opening and then move down the track at the speed at which the railcar moves to maintain control over the discharge of ballast from the railroad hopper car.

To reduce numerous problems associated with manually controlling the disposition of the doors of such gate assemblies, some gate assemblies have been designed with powered drivers for controlling the disposition of the door assemblies relative to the outlets in the frame of the gate assembly. For example, some gate assemblies have been designed with hydraulic drivers disposed between the gate assembly frame and each door assembly for positioning the door assemblies relative to the frame thereby controlling the discharge of ballast from the hopper car. As will be appreciated, the railroad cars equipped with these gate assemblies operate in various temperature climates. Unfortunately, extremely cold conditions have an adverse effect on and often prohibit the use of hydraulic drivers for such gate assemblies.

Hydraulically operated gate assemblies are furthermore hindered by the relatively high maintenance required for the hydraulic drivers of such gates. Moreover, and as will be appreciated by those skilled in the art, such hydraulic drivers are not easily repaired. Inadvertent or other forms of contamination of the hydraulic fluids associated with these types of drivers is also a paramount concern. Additionally, and especially when used in conjunction with gate assemblies, hydraulically operated drivers normally consume more power than other types of drivers primarily due to the frictional operating characteristics inherent with such drivers. Hydraulically operated gate assemblies furthermore present serious environmental concerns during maintenance and throughout the life span of the drivers.

Gate assemblies utilizing pressurized air operated drivers are likewise susceptible to failure. An unavoidable accumulation of moisture in the reservoirs and accumulators of air operated gates tends to quickly freeze valves typically arranged in operable combination therewith. Of course, when the valves freeze, such gate assemblies are rendered substantially inoperable until the valves are sufficiently thawed to allow for operation of the air operated system. This can cause a significant delay. Of course, such delays are both costly and cannot always be tolerated.

Another problem which has been identified with air operated systems involves the size or diameter of the cylinders which are required to develop the necessary force or power required to move the gates from a closed position toward an open position when a full load or weight of the ballast is applied against the gates. Of course, diminishing the diameter or width of the drivers and thereby yielding more spaciousness in the area of the gates is a continuing and long sought goal of railroad hopper car gate designers for such spaciousness can alternatively and advantageously be used for alternative purposes. Like hydraulically operated systems, air operated systems are not easily repaired. Moreover, the hoses or conduits extending from the air cylinders, ultimately, have to be connected to the locomotives, thus, adding to the overall costs of such systems.

Electric drivers for such railroad hopper car gate assemblies typically suffer from several drawbacks. First, known electric drivers have neither the speed nor power to allow the door assemblies to be moved from a closed position toward an open position without placing an extremely heavy draw on the power source. Second, lengthy electrical conduits are required between the door assemblies on those railcars at the rear of the train consist and the locomotive or an alternative source of power for such electrical drivers. Moreover, component parts of such electric motors are susceptible to shocks and vibrations of the railcar as the car is transported between locations across the country.

Often times, railroad cars having electrically operated gates are equipped such that the electric motors on such gates can be operated either through switches on the railcar or through use of a remote control apparatus. Research has found that when one operator or maintenance person is manually controlling the electrically operated gate in a certain direction, as through a switch on the side of the car, another operator or maintenance person, with the remote control apparatus, and although inadvertent, often signals or directs the same electrically driven gate to operate in an opposite or reverse direction, thus, causing significant problems. As will be appreciated, directing or controlling the same electric driver for a gate assembly from two opposite sources but in opposite directions can cause significant problems typically resulting in damage to the electric motor.

Thus, there is a continuing need and desire for a railroad hopper car gate assembly which uses other than manually operated door assemblies so as to promote remote or automatic actuation of the gate assembly in an efficient and effective manner without having each railroad car equipped with such a door assembly having to be connected to a common power source and which is operable through all temperatures ranges. Furthermore, there is a continuing need and desire to protect the electric drivers for such door assemblies against concurrent and inadvertent control directives derived from two sources and which are in opposition relative to each other.

SUMMARY OF THE INVENTION

In view of the above, and in accordance with one aspect of the present invention, there is provided a railroad hopper car gate assembly including a frame configured for attachment to a hopper body of a railroad hopper car in material receiving relation relative to an outlet on the railroad car, and wherein the frame defines at least one discharge opening. A door assembly is mounted on the frame for generally vertical sliding movements between open and closed positions relative to the discharge opening on said frame. One salient feature of the present invention relates to providing a driver which is operably coupled between the frame and the door assembly for selectively effecting sliding movements of the door assembly relative to said discharge opening between the open and closed positions.

To overcome problems of heretofore known drivers for such railroad hopper car gate assemblies, the driver of the present invention is specifically designed to develop up to a 2000 lb. opening force on the door assembly and a substantially constant speed of about 2.0 inches per second as the door assembly moves from the closed position to the open position. Preferably, each driver for the gate assembly includes a direct current electric drive motor which draws less than about 30 amperes from a power source when the door assembly is moved from the closed position to the open position.

Preferably, the frame of the railroad hopper car gate assembly of the present invention defines inner and outer discharge openings; with each opening having a door assembly arranged in operable association therewith and wherein each door assembly is operated by a driver. Each discharge opening on the frame is disposed to one or the other side of a rail over which the railcar moves. The frame of the gate assembly furthermore preferably includes a pair of opposed angular ledges disposed to opposed sides of each discharge opening in generally planar relation relative to each other for supporting opposite sides of the door assembly for generally vertical sliding movements between the open and closed positions relative to the respective discharge opening on said frame. Each door assembly includes a door having a generally planar configuration including upper and lower surfaces and further includes slides arranged along a portion of the lower surface of the door. The door slides engage with the ledges on the frame and dispose the door assembly at an acute angle relative to the ledges on the frame.

In a preferred embodiment, the gate assembly includes a 24 volt power source preferably in the form of batteries arranged and carried on each railroad hopper car. Moreover, a solar array provided on each railroad hopper car equipped with a gate assembly according to the present invention is connected to and serves to maintain the batteries in a constant charge. In those preferred designs where batteries are used as a power source, an electrical connector extends between the batteries and the direct current motor of the driver. Such electrical connector is advantageously provided with a first releasable connector at that end where the electrical connector is operably coupled to the driver and a second releasable connector at that end whereat the connector is operably connected to the batteries thereby facilitating repair and/or replacement of either the driver or the batteries as required or needed.

Each driver is preferably designed with a reversible electromechanical motor. To inhibit inadvertent damage to the direct current electric motor of each modular driver, a thermal overload apparatus is preferably arranged as part of each driver. Moreover, and to inhibit damage to the driver from limitations on sliding movements of a respective door assembly, each driver is preferably provided with a clutch which inhibits transfer of power to an output of the driver under predetermined conditions.

Each electromechanical driver is designed to be substantially vibration resistant. In a preferred form, the electromechanical driver includes a gear set driven by the direct current electric motor. The gear set preferably includes a driven gear for driving a worm gear coupled to an output of the driver. In a preferred embodiment, each driver furthermore includes a first housing connected to the motor and arranged in surrounding relation relative to the gear set and a second housing connected to the first housing and arranged in surrounding relation relative to the worm gear. Seal structure, disposed between the second housing and the output of the driver, allows each driver to be angularly disposed relative to the frame of the gate assembly as required and/or needed. In a preferred embodiment, the drivers are disposed in substantially common vertical planes relative to each other thereby substantially reducing the overall width of the gate assembly.

In a preferred embodiment, a linkage mechanism operably couples each driver to a respective door assembly. In one embodiment, the gate assembly further includes inner and outer shafts. The inner shaft is rotatably supported by the gate assembly frame and is disposed to an inner side of a longitudinal axis defined by the frame and the outer shaft is rotatably supported by the frame and is disposed to an outer side of the longitudinal axis defined by the gate assembly frame. The linkage assembly operably couples each shaft with a respective gate. With the present invention, each shaft turns through an arc of approximately 70° as the respective gate moved thereby moves between the open and the closed positions.

In a preferred form, the reversible driver for each door assembly can be operated either through a manual actuator or switch mounted on the railroad hopper car or via a radio frequency transmitter or other suitable apparatus capable of remotely actuating the door assemblies. As such, the size of each opening through which ballast can be discharged from the hopper car can be controlled either through manual manipulation of the actuator or switch, as an operator walks along adjacent the railcar, or from a remote location via the radio transmitter. As noted above, however, the operator using the remote control apparatus may not always be positioned to determine or accurately observe that an operator, possibly walking on an opposite side of the car, may be using the switch or manual actuator in a manner which may be contrary to or the reverse of the manner in which the remote control actuator is being operated. Accordingly, two directives or signals, opposite from one another, can be inadvertently and concurrently sent to the electric drivers to control the gate assemblies. As mentioned above, and as will be appreciated by those skilled in the art, sending two opposed signals directing a single electric motor to operate in reverse directions can prove detrimental to proper performance of the driver and can even result in significant damage thereto.

According to another aspect of the invention, the switches or manual actuators on the car and the remote control apparatus for operating the drivers of the door assemblies are operably connected to a controller including a computerized microprocessing unit operable in combination with the 24 volt system mounted on each railcar. The microprocessing unit includes circuitry for inhibiting damage to the reversible drivers when two opposing open/close directives are concurrently developed or derived from the manual actuators and the remote control apparatus.

According to still another aspect of the invention, a method for operating the gate assemblies including the step of inhibiting damage to the reversible drivers when two opposing open/close directives are concurrently developed or derived from the manual actuators and the remote control apparatus is also disclosed.

A principal object of this invention is to provide a gate assembly for a railroad hopper car including a slidable door assembly whose selectively controlled position allows ballast from a hopper car to be discharged to one or the other or both sides of a rail over which the railcar moves and which includes electromechanical drivers for moving the door assemblies, with each such electromechanical driver having sufficient speed and power to selectively permit opening of the door assembly while the door assembly is under full load through use of a direct current electric motor which draws no more than 30 amperes from an electrical power source to effect movement of the gate from the closed position to the open position.

Another object of this invention is to provide a gate assembly for a railroad hopper car wherein each door assembly is operably coupled to electromechanical drivers which are modular in design thereby readily permitting their repair and/or replacement, as needed and/or desired, and which are operated from a 24 volt system including batteries which are mounted on the railroad hopper car.

Still a further object of this invention is to provide a gate assembly for a railroad hopper car wherein each door assembly is operably coupled to an electromechanical driver including a direct current electric motor having multiple housings which are both shock and vibration resistant thereby promoting transportation of the railcar between locations.

Another object of this invention is to provide a gate assembly for a railroad hopper car wherein the each door assembly is operably coupled to an electromechanical driver including a direct current electric motor that is sealed to the environment and allows the drivers to be orientated in substantially all directions relative to the frame.

Still another object of the present invention is to design a gate assembly for allowing ballast to be discharged to either or both sides of a rail along which a railcar moves and which has a reduced width requirement when matched to comparable and heretofore known gates.

A further object of this invention is to allow the drivers for each door assembly to be operated either through manual manipulation of an actuator on the railcar or through a remote control apparatus, and wherein each driver is protected against damage resulting from opposing open/close directives being concurrently developed by the manual actuators and the remote control apparatus and which are intended to control the same door assembly.

Yet another object of this invention is to provide a method wherein the door assemblies of the gate assembly are selectively controlled as through manual manipulation of switches or through a remote control apparatus and wherein the drivers for each gate assembly are inhibited from damage resulting from opposing open/close directives being concurrently directed toward a single driver from both the manual actuators and the remote control apparatus.

These and other objects, aims and advantages of the present invention will become readily apparent from the following detailed description, the drawings, and the appended claims.

DETAILED DESCRIPTION OF THE DRAWINGS

FIG. 1 is a schematic side elevation of a railroad hopper car to which the gate assembly of the present invention has been installed;

FIG. 2 is a schematic top plan view of the hopper car illustrated in FIG. 1;

FIG. 5 is a sectional view taken along line 5—5 of FIG. 3;

FIG. 6 is an end view of a door assembly forming part of the present invention;

FIG. 7 is a bottom plan view of the gate illustrated in FIG. 6;

FIG. 8 is a fragmentary enlarged side elevational view of a gate assembly according to the present invention;

FIG. 11 is a schematic illustration of an electrical conduit preferably used in combination with the present invention;

DETAILED DESCRIPTION OF THE PRESENT INVENTION

Figure 3:
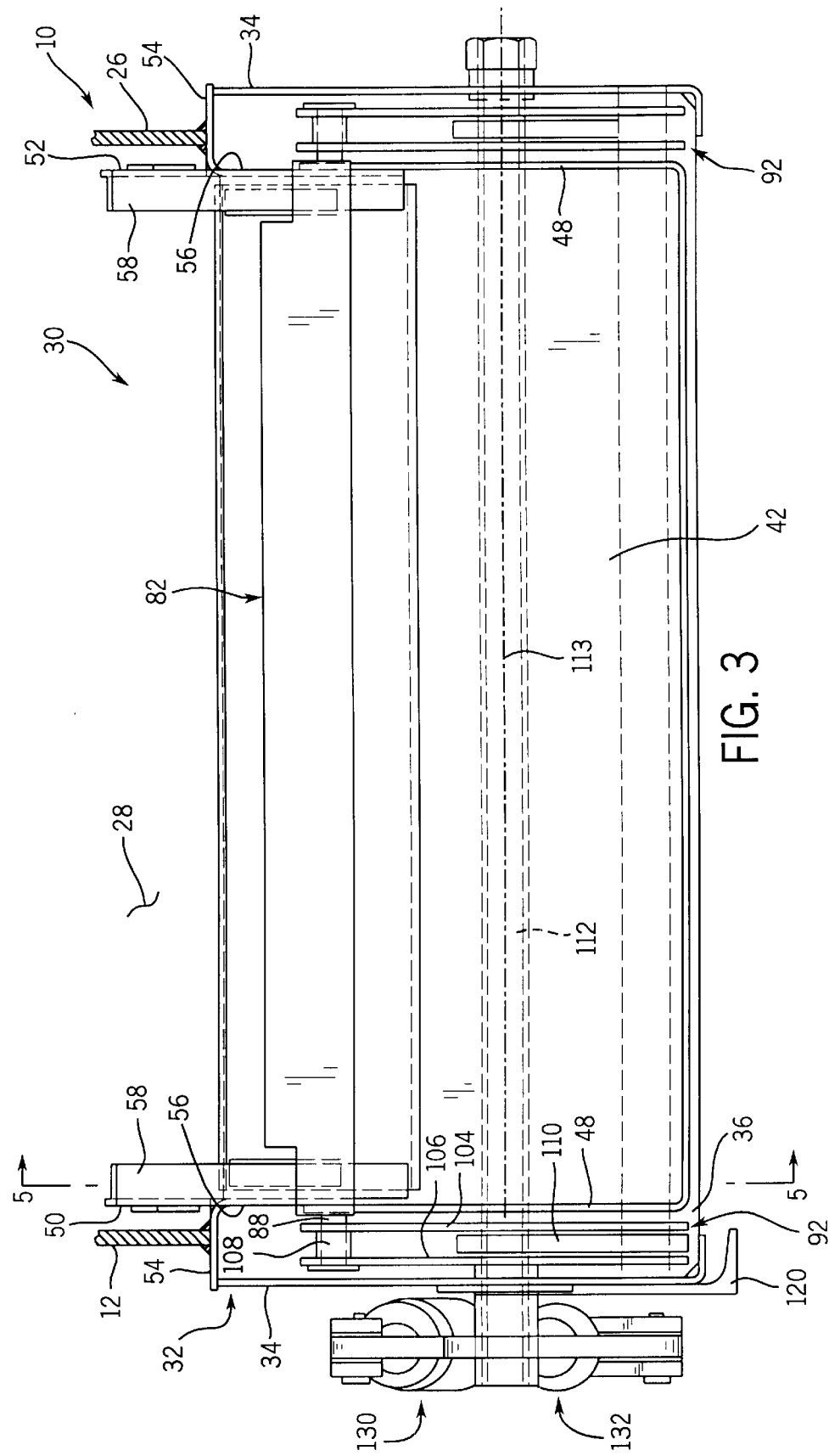
FIG. 3 is a detailed side elevational view, partially in section, of one of the gate assemblies illustrated in FIG. 1.

While the present invention is susceptible of embodiment in various forms, there is shown in the drawings and will hereinafter be described a preferred embodiment of the invention with the understanding the present disclosure is intended to set forth an exemplification of the present invention which is not intended to limit the invention to the specific embodiment illustrated.

Referring now to the drawings, wherein like reference numerals indicate like parts throughout the several views, there is shown in FIG. 1 a railroad hopper car, generally designated by reference numeral 10. The car 10 includes a hopper body 12 defined by spaced sidewalls 14 and 15 (FIG. 2). As is well known, the sidewalls 14 and 15 rigidly join opposed end walls 16 and 17. A bottom 18 of the hopper car body 12 is supported in a well known manner by trucks 20 shown pictorially in FIG. 1. Wheels of the trucks 20 engage a pair of transversely spaced rails designated generally by reference numerals 22 and 24 on a track bed 25.

To facilitate gravity unloading of the contents or ballast from the hopper body 12, the car bottom 18 is formed in part by sheets 26 which slope downward and terminate at lower discharge openings 28. Typically, the car body 12 is formed with four outlets or openings, with two such longitudinally spaced outlets being vertically aligned with the rail 22 and the other two longitudinally spaced outlets being vertically aligned with the other rail 24. Below each outlet or opening 28 is a gate assembly 30 according to the present invention.

In the preferred embodiment of the invention, all the gate assemblies 30 on the hopper car 10 are similar in construction and, therefore, only one gate assembly need be described in detail for a proper and complete understanding thereof. As illustrated in FIG. 3, each gate assembly 30 includes a frame 32 configured for attachment to the hopper body 12 in material receiving relation relative to each outlet or opening 28.

Figure 4:
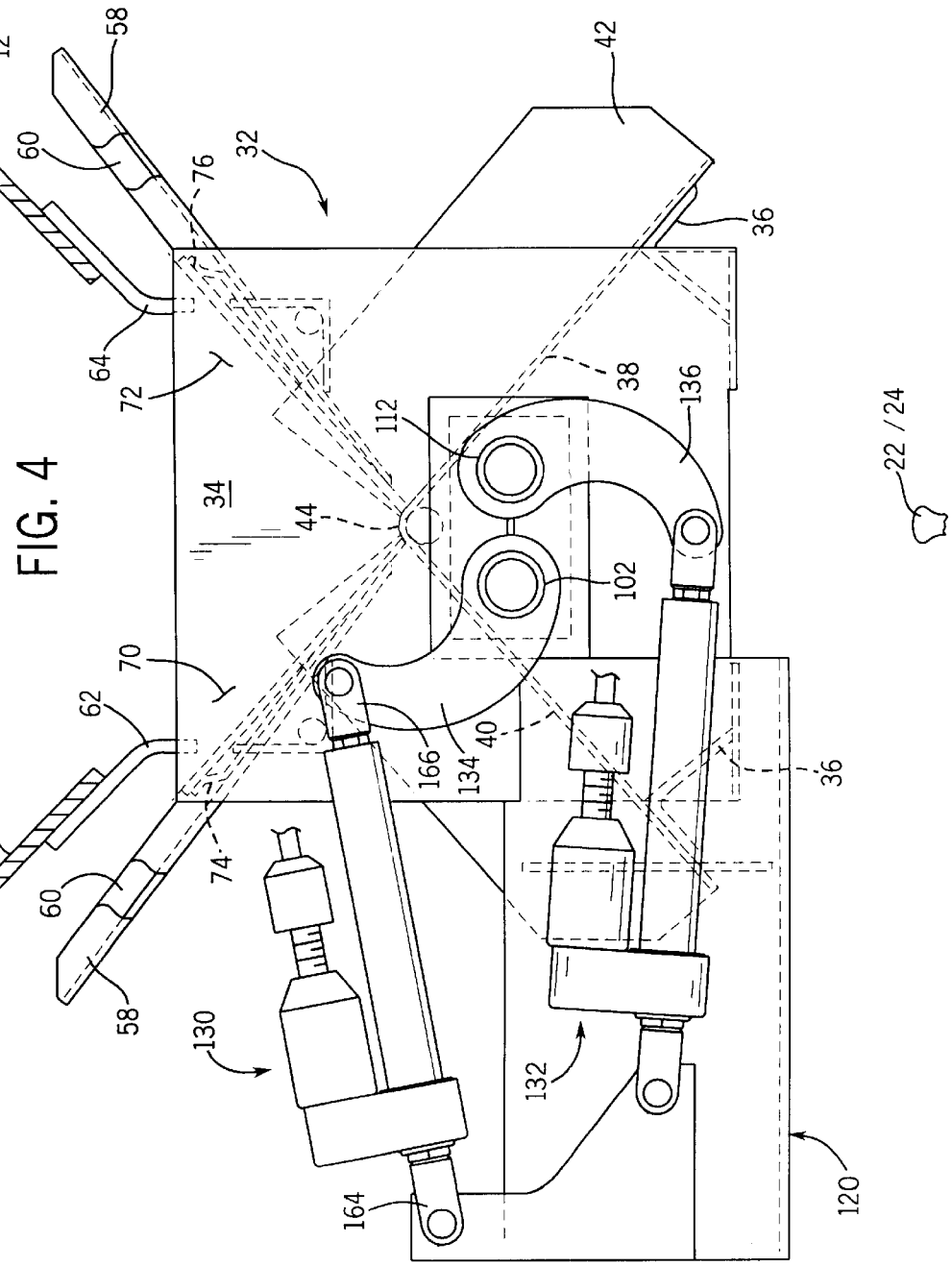
FIG. 4 is a sectional view taken along line 4—4 of FIG. 1.

In the exemplary embodiment illustrated, the frame 32 of each gate assembly 30 includes a pair of longitudinally spaced end panels 34. As shown in FIGS. 3, 4 and 5, the end panels 34 are rigidly joined to each other, toward their lower outermost edges, by a pair of transversely spaced angles 36. Frame 32 furthermore includes a chute 38 extending longitudinally between the spaced end panels 34.

In the embodiment illustrated in FIG. 4, the chute 38 includes inner and outer channels 40 and 42, respectively. From their lower terminal ends, the channels 40, 42 slope angularly upward and converge to form a longitudinally extending edge 44 which is preferably vertically aligned with the respective rail 22, 24 disposed therebeneath. As illustrated, each angle 36 is offset so that a leg portion 46 of each angle 36 engages and supports and underside of the inner and outer channels 40, 42, respectively. Preferably, and to control the flow of ballast, chute 38 furthermore includes pairs of vertical end flanges 48 formed at a generally right angle to the channels 40 and 42, respectively.

The frame 32 of each gate assembly 30 furthermore includes longitudinally spaced end walls 50 and 52. As shown in FIG. 3, each end wall 50, 52 has an upper outwardly extending attachment flange 54 which promotes attachment or fastening of the gate assembly 30 to the car bottom side sheets 26. In the exemplary embodiment, and as shown in FIG. 4, each end wall 50, 52 further includes a vertical and generally triangular shaped portion 56 with opposed angularly sloping ledges 58 and 60 which downwardly extend proximate to the edge 44 of the divider panel 38. Notably, the sloping ledges 58 and 60 of end wall 50 are arranged in generally planar relationship with the sloping edges 58 and 60 of end wall 52.

As illustrated in FIGS. 4 and 5, joining the end walls 50 and 52 are inner and outer sidewalls 62 and 64, respectively, which cooperate with the car bottom slope sheets 26 in fastening or attaching the gate assembly 30 to the railroad hopper car 10. As will be appreciated from an understanding of this construction, and as shown in FIGS. 4 and 5, the terminal ends of the sidewalls 62 and 64 are disposed with respect to and combine with the channels 40 and 42, respectively, of the chute 38 to define inner and outer discharge openings 70 and 72, respectively, for the gate assembly 30.

In the illustrated embodiment, and as shown in FIGS. 4 and 5, gate assembly 30 furthermore includes inner and outer door assemblies 74 and 76, respectively. Each door assembly 74, 76 is mounted for generally vertical sliding movements between and is supported on the ledges 58 and 60 of the sidewalls 62 and 64 of frame 32. As will be appreciated, each door assembly or gate 74, 76 is generally linearly movable between open and closed positions relative to the respective discharge openings 70, 72, respectively.

In the illustrated embodiment, door assemblies 74 and 76 are similar in construction and, therefore, only one door assembly is described in detail for a full and complete understanding thereof. As shown in FIG. 6, each door assembly 74, 76 includes a door 77 having a generally planar configuration including upper and lower surfaces 78 and 80, respectively. As illustrated in FIGS. 6 and 7, longitudinally attached to the lower surface 80 of each door 77 is an angle 82. In the exemplary embodiment, opposed ends of the angle 82 are notched or otherwise configured to provide clearance for attachment of slides 84 and 86 to the lower surface 80 of each door assembly 74, 76. The slides 84 and 86 are arranged to slide along the ledges 58 and 60 of the end walls 50 and 52 and are designed to arrange each door assembly 74, 76 at an acute angle relative to the ledges 58 and 60 of the end walls 50 and 52 of frame 32. In the illustrated embodiment, a stub shaft 88 is secured interiorly of each angle 82 and extends longitudinally outward therefrom.

Returning to FIG. 5, and in the exemplary embodiment, the stub shafts 88 on each door assembly 74 and 76 are connected to pairs of linkages 90 and 92 provided at opposed ends of each door assembly 74, 76. The first pair of linkages 90 operate the inner door assembly 74. The second pair of linkages 92 operate the outer door assembly 76. In the illustrated embodiment, the linkage pairs at opposite ends of the each door assembly 74, 76 are substantially similar to each other and, therefor, only one linkage of each pair of linkages 90, 92 need be described in detail to appreciate a complete and full understanding thereof As schematically illustrated in FIG. 5, each linkage pair 90 includes a pair of spaced links 94 and 96 which are articulately connected at one end to the stub shaft 88 extending longitudinally outward from the respective end of the angle 82 on the inner door assembly 74. A spacer 98, located about each shaft 88, maintains the links 94 and 96 in spaced relationship. Opposite ends of the links 94 and 96 of each pair of linkages are articulately connected toward an end of a drive arm 100 embraced by the links 94 and 96 and radially extending from and non-rotatably fastened to an inner shaft 102. Along its length, shaft 102 is rotatably journalled about a fixed axis 103 by the end panels 34 of gate assembly frame 30.

As illustrated in FIGS. 5 and 8, each linkage pair 92 includes a pair of spaced links 104 and 106 which are articulately connected at one end to the stub shaft 88 extending longitudinally outward from the respective end of the angle 82 on the outer door assembly 76. A spacer 108, located about each shaft 88, maintains the links 104 and 106 of linkage 92 in spaced relationship. Opposite ends of the links 104 and 106 are articulately connected toward an end of a drive arm 110 embraced by the links 104 and 106 and radially extending from and non-rotatably fastened to an outer shaft 112. Along its length, shaft 112 is journalled for rotation about a fixed axis 113 by the end panels 34 of gate assembly frame 30.

Returning to FIG. 4, and in the illustrated embodiment, frame 32 of the gate assembly 30 further includes a mount 120 extending transversely from an end panel 34 of the frame 32. Mount 120 provides for articulated attachment of one end of a pair of reversible electromechanical drivers 130 and 132 which selectively operate the inner and outer door assemblies 74 and 76, respectively, between their open and closed positions. In the illustrated embodiment, the drivers 130, 132 are advantageously arranged in a substantially common vertical plane relative to each other thereby significantly reducing the overall width of the gate assembly 30. An opposite end of the driver 130 is articulately connected toward the free end of a lever arm 134 radially extending from and non-rotatably secured to the inner shaft 102. An opposite end of the driver 132 is articulately connected toward the free end of a lever arm 136 radially extending from and non-rotatably secured to the outer shaft 112. The drivers 130 and 132 are substantially similar in construction and, therefore, only driver 130 need be described in detail to appreciate a complete and full understanding thereof.

Each driver 130, 132 is specifically designed to impart a 2000 lb. opening force on the respective door assembly connected thereto and an opening speed ranging between about 1.8 inches per second and about 2.1 inches per second as the respective gate moves from the closed position to the open position. In a most preferred form of the invention, each driver 130, 132 is specifically designed to impart an opening speed of 2.0 inches per second as the respective gate moves from the closed position to the open position. Notably, and as compared to equivalent pneumatic or hydraulic drivers, the electric drivers 130, 132 impart a substantially constant speed to and during movement of the door assemblies 74 and 76 between their open and closed positions and regardless of the load placed thereon by the ballast in the hopper 12.

Figure 9:
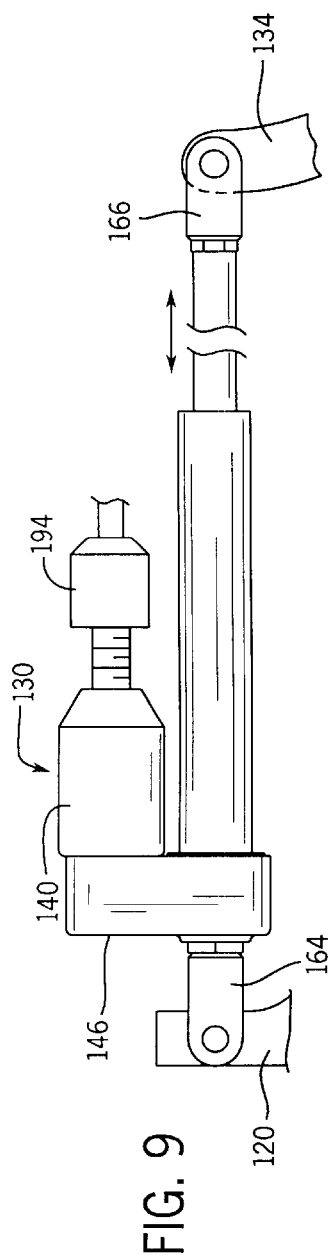
FIG. 9 is a side elevational view of a driver forming part of the present invention.
Figure 10:
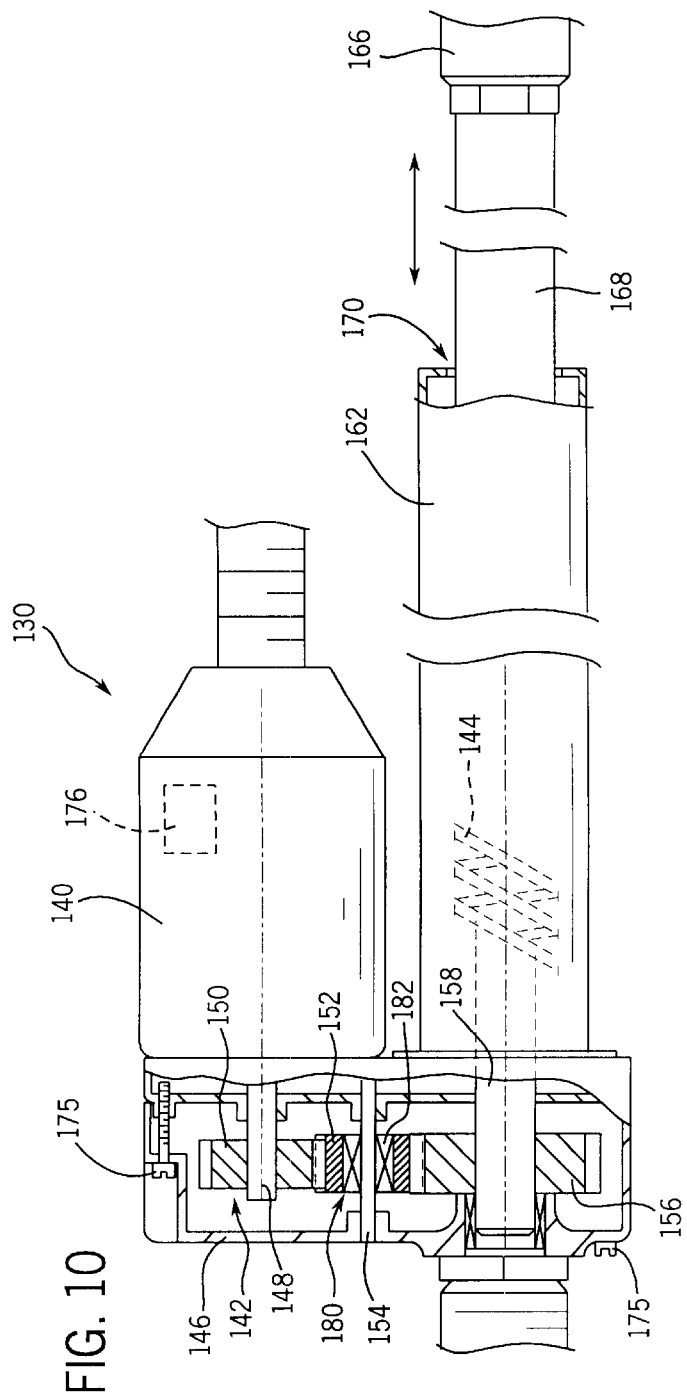
FIG. 10 is an enlarged fragmentary side elevational view, partially in section, of the driver illustrated in FIG. 9.

Turning to FIGS. 9 and 10, each driver 130 is preferably configured as a modular unit which is operably interposed between the gate assembly frame 32 and a respective gate 74, 76. The modularity of each driver 130, 132 readily permits and facilitates repair and/or replacement of each driver 130, 132 as a whole when required or desired. As schematically represented in FIG. 10, each driver 130, 132 includes a direct current electric motor 140, a gear set 142 driven by the electric motor 140, and a worm gear or lead screw 144 driven by the gear set 142. Notably, the direct current electric motor 140 is specifically designed and developed to draw no more than 30 amperes from a power source in response to movement of either door assembly 74, 76 between open and closed positions and when the door assembly is under full load. The term "full load" means and refers to when the railroad car 10 is filled with ballast which gravitationally presses against the door assemblies 74, 76 and the ballast is compacted.

In the exemplary embodiment illustrated in FIG. 10, the direct drive electric motor 140 is connected to a gear set housing 146 and has an output shaft 148. A drive gear 150 of the gear set 142 is non-rotatably carried on the shaft 148 of motor 140 toward a distal end thereof. In the illustrated embodiment, an idler gear 152 is rotatably mounted on a stub shaft 154 having opposite ends supported by the gear set housing 146. A driven gear 156 of gear set 142 is connected to a shaft 158 having the elongated worm gear 144 thereon. The lead screw or worm gear 144 is rotatably arranged within an elongated housing 162 fastened to the gear set housing 146. As is conventional, and in response to rotational movement being imparted to the worm gear 144, an output 168 of each driver 130, 132 linearly moves in a direction dependent upon the direction of rotation imparted to the worm gear 144.

As illustrated in FIGS. 4 and 9, a clevis 164 is connected to and extends from the gear set housing 146 thereby facilitating articulated connection of one end of each driver 130, 132 to the mount 120 on the frame 32 of the gate assembly 30. Preferably, and to inhibit the clevis 164 from inadvertently turning relative to the gear set housing 146, the clevis 164 is pinned or otherwise prevented from rotating relative to the housing 146.

In the embodiment illustrated in FIGS. 4 and 9, another clevis 166 is connected to an output 168 for each driver 130, 132 and is articulately connected to the respective lever arm 134, 136 radially extending from the inner and outer shafts 102, 112, respectively. Preferably, and to inhibit the clevis 166 from inadvertently turning relative to the output 168 of the driver 130, 132, the clevis 166 is pinned or otherwise prevented from rotating relative to the output 168. As will be appreciated from the above, the connection between the output 168 and the respective lever arm 134, 136 prevents the output 168 from rotating with the lead screw 160 thereby allowing rotation of the lead screw or worm gear 160 to be converted to linear movements of the output 168 of each driver 130, 132. Moreover, simply disconnecting each clevis 164, 166 at opposite ends of each driver 130, 132 from the frame 32 and the respective lever arm 134, 136, readily and easily permits repair and/or replacement of either or both drivers 130, 132.

As schematically illustrated in FIG. 10, seal structure 170 is provided at that end of the housing 162 from which the output 168 linearly extends. Seal structure 170 serves several useful purposes. First, the seal structure 170 inhibits moisture and contaminants from moving therepast and into the housing 162. Second, the seal structure 170 allows the drivers 130, 132 to be arranged in substantially any angular position orientation relative to the frame 32 of the gate assembly thereby promoting design of the gate assembly 30.

In the exemplary embodiment of the invention illustrated in FIG. 10, fasteners 175 are used to interconnect the gear set housing 146 to the electric motor 140 and to the housing 162 for the worm gear 160. The fasteners 175 used to effect such connection are specifically designed to inhibit them from becoming lose or failing to maintain the connection between the various components of the driver 130, 132. Several conventional devices and/or methods can be used for securing the fasteners 175 against losing and failing. For example, each fastener 175 used to interconnect the various components of the drivers 130, 132 can be independently pinned or, alternatively, embody conventional mechanical means for inhibiting inadvertent rotation thereof Accordingly, the drivers 130, 132 for the gate assembly 30 of the present invention are substantially vibration resistant as the railcar 10 travels between locations.

As shown in FIG. 10, each driver 130, 132 furthermore includes an apparatus 176 for inhibiting damage to the direct current electric motor 140 resulting from inadvertent overheating of the electric motor 140. As will be appreciated by those skilled in the art, if a door assembly or gate 74, 76 fails to move while the electric motor 140 continues to operate, a significant level of heat can result. Of course, if too much heat is developed, damage can result to the motor 140. The apparatus 176 can take a myriad of conventional designs, including but not limited to a diode (not shown), which will effectively disable the direct current electric motor 140 after such apparatus 176 senses or detects a level of heat or temperature which could prove detrimental to continued operation of the direct current electric motor 140.

As furthermore schematically illustrated in FIG. 10, each driver 130, 132 includes an apparatus 180 for inhibiting damage to the driver 130, 132 resulting from limitations on sliding movements of the door assemblies 74, 76. As appreciated by those skilled in the art, if a door assembly 74, 76 fails or has limitations on its sliding movements, and a driver 130, 132 continues to operate to move a respective door assembly 74, 76, significant damage can occur to the driver 130, 132. Accordingly, and in the exemplary embodiment, the gear set 142 of each driver 130, 132 is provided with a clutch 182 operably interposed between the output shaft 148 of the electric current motor 140 and the output 168 of each driver 130, 132. The purpose of clutch 182 is to maintain a drive connection between the motor 140 and the output 168 of the driver 130, 132 as long as usual forces for slidably moving the door assembly 74, 76 are detected. Should the door assembly 74, 76 be limited in its sliding movements while the driver 130, 132 remains enabled to move the door assembly 74, 76, and after a predetermined level, the clutch 182 effectively slips thereby disabling the drive connection between the motor 140 and the output 168 of the driver 130, 132 thereby guarding against damage to the driver 130, 132.

The reversible electromechanical drivers 130, 132 for the gate assembly 30 of the present invention preferably operate from a 24 volt power source. Returning to FIG. 1, a 24 volt power source 186 including self-contained batteries 188 is illustrated as being mounted or carried on each hopper car 10 for powering the reversible electromechanical drivers 130, 132 (FIG. 4). Of course, power could likewise be provided from a locomotive (not shown) or another common power source as well. In a most preferred embodiment, and as illustrated in FIG. 1, each railcar 10 embodying the present invention is preferably provided with a solar array panel 190 which is connected to the batteries 188 through any suitable and conventional means.

As illustrated in FIG. 11, and to further promote repair and/or replacement of the drivers 130, 132, an electrical conduit 192 with a first releasable connector 194 at one end and a second releasable connector 196 at the opposite end is preferably used to releasably interconnect each driver 130, 132 to the batteries 188. The connector 194 is used to releasably interconnect the conduit 192 to either direct current electric drive motor 140 of drivers 130, 132 and the connector 196 serves to releasably interconnect conduit 192 to the batteries 188. In a most preferred embodiment, No.10 AWG connectors sold by Brad Harrison under Model No. 32065 appear best suited for the purpose of releasably interconnecting conduit 192 between the batteries 188 and the direct current electric motor 140 of either driver 130, 132.

Figure 12:
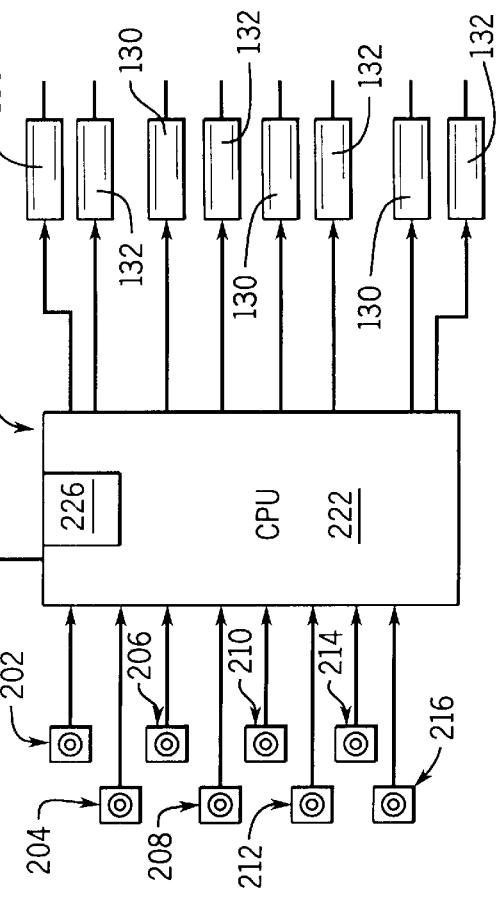
FIG. 12 is a schematic block diagram of a control system for operating the gate assemblies of the present invention.

Turning to FIG. 12, and when four gate assemblies are arranged on the railroad hopper car 10, with each gate assembly 30 including two door assemblies 74, 76, the railroad car 10 is provided with a series of manual actuators or switches 202, 204, 206, 208, 210, 212, 214, and 216 for operating the various gate assemblies 30 on the railcar 10 for movement between open and closed positions. Suffice it to say, each gate assembly 30 having two gate assemblies 74, 76 associated therewith is controlled with two manual switches; with one switch controlling the opening and closing of the door assembly 74 of a respective gate assembly 30 and with another switch controlling the opening and closing of the other door assembly 76 of the respective gate assembly 30. Alternatively, a remote control apparatus 218 is provided for selectively and remotely operating the door assemblies 74, 76 of the various gate assemblies 30 on the railcar 10 for movement between the open and closed positions such that ballast from the hopper can be remotely, alternatively discharged from said outlets while said railroad car moves along the track bed 25.

As schematically illustrated in FIG. 12, the switches 202 through 216 are operably coupled to a controller 220 which broadly includes a Central Processing Unit (CPU) or microprocessor 222. As will be appreciated, the CPU or microprocessor 222 controls opening and closing movements of the door assemblies 74, 76 of each gate assembly 30 in response to open/close directives or signals received from either the manual actuators or switches 202 through 216 or from the remote control apparatus 218. As schematically illustrated in FIG. 12, a radio frequency receiver 219 is mounted on the railroad car 10 and is operably connected to the controller 220 for receiving a coded radio frequency signal from the remote control apparatus 218 and directing open/close directives to the controller 220 as a function of the coded radio frequency signals received from the remote control apparatus 218. As described in detail hereinafter, the controller 220 is provided with logic circuitry or a system 226 for inhibiting damage to the drivers 130, 132 associated with the door assemblies 74, 76 of each gate assembly 30 when two opposing open/close directives or signals are concurrently received from the manual actuators 202 through 216 and the remote control apparatus 218.

Figure 13:
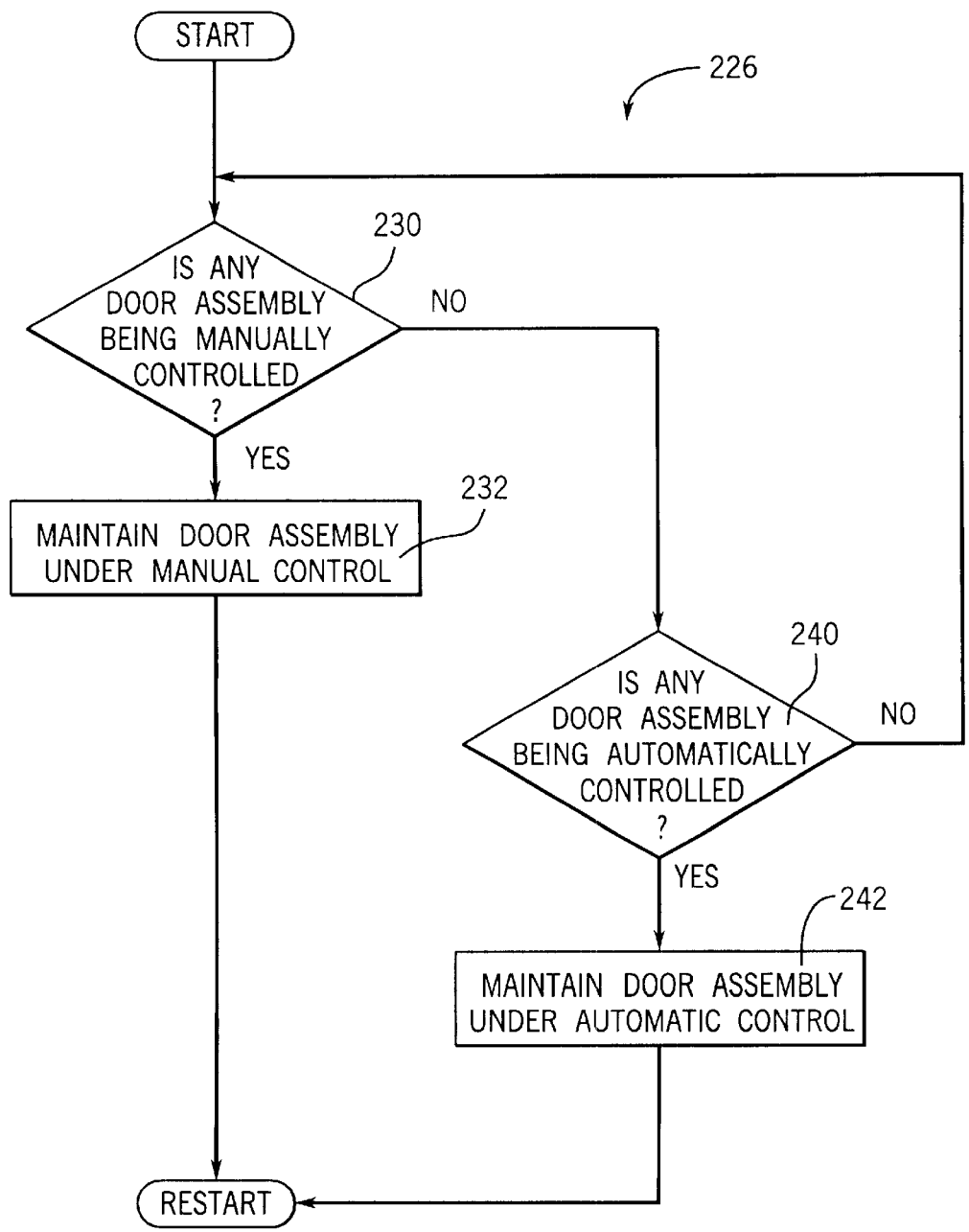
FIG. 13 is a logical flow chart for controlling operation of the door assemblies either through manual actuators or through a remote control apparatus.

Operation of the logic circuitry or system 226 is depicted in flow chart form in FIG. 13. The logic circuitry or system 226 computes the condition of the switches 202 through 216 and the condition of the remote control apparatus 218 at regular intervals during operation of the railcar 10. After initiation, system 226 determines at step 230 whether any door assembly 74, 76 of any gate assembly 30 on the railroad hopper car 10 is being manually controlled under the influence of any one or more of the manual actuators or switches 202 through 216. If the system 226 determines at step 230 that no door assembly 74, 76 of any gate assembly 30 is being manually controlled under the influence of any one or more of the manual actuators or switches 202 through 216, the system 226 automatically proceeds to step 240. At step 240, the logic circuitry or system 226 determines whether any door assembly 74, 76 of any gate assembly 30 on the railroad hopper car 10 is being controlled under the influence of the remote control apparatus 218. If the system 226 determines at step 240 that no door assembly 74, 76 of any gate assembly 30 is being manually controlled under the influence of the remote control apparatus 218, the system 226 automatically returns to step 230 and the cycle or interval of system 226 repeats.

If the logic circuitry or system 226 determines at step 230 that one or more door assemblies 74, 76 of one or more gate assemblies 30 on the railroad hopper car 10 is being opened or closed under the influence of one or more of the manual actuators or switches 202 through 216, the system 226 then automatically proceeds to step 232. At step 232, the system 226 maintains control of that particular door assembly 74, 76 being operated by the manual actuators 202 through 216 under the exclusive control of the respective manual actuators 202 through 216 associated with the moving door assembly 74, 76 and inhibits the remote control apparatus 218 from fluencing operation of those respective drivers 130, 132 associated with the particular door assembly 74, 76 being controlled by the manual actuators 202 through 216. It should be appreciated, however, system 226 does not inhibit operation, as through the remote control apparatus 218, of any other door assembly 74, 76 of any other gate assembly not being controlled at the time through the manual actuators or switches 202 through 216. Accordingly, the logic circuitry 226 of controller 220 only inhibits operation, as through the remote control apparatus 218, of only those door assemblies 74, 76 which are presently or immediately under the control of a manual actuator or switch 202 through 216.

Similarly, if system 226 determines at step 240 that one or more door assemblies 74, 76 of one or more of the gate assemblies 30 on the railroad hopper car 10 is being opened or closed under the influence of the remote control apparatus 218, the system 226 then automatically proceeds to step 242. At step 242, the logic circuitry or system 226 maintains control of that particular door assembly 74, 76 being remotely operated by the control apparatus 218 under the exclusive control of the remote control apparatus 218 and inhibits the manual actuators or switches 202 through 216 from influencing operation of the particular door assembly 74, 76 being controlled by the remote control apparatus 218. It should be appreciated, however, system 226 does not inhibit operation, as through the manual actuators 202 through 216, of any door assembly 74, 76 of any gate assembly 30 on the railroad hopper car 10 not being controlled at the time through the remote control apparatus 218.

Accordingly, the logic circuitry 226 of the controller 220 inhibits operation, as through the manual switches 202 through 216, of only those door assemblies 74, 76 which are presently or immediately under the control of the remote control apparatus 210.

The door assembly actuating switches or manual actuators 202 through 216 operate in combination with the 24 volt system on the railcar 10. In the embodiment illustrated for exemplary purposes, the manual switches 202, 204 and 206, 208 are mounted on a first side of the car 10 and preferably control operation of the door assemblies 74, 76 on the two gates assemblies 30 on the corresponding side of the car 10. The manual actuators or switches 210, 212 and 21, 216 are mounted on the opposite side of the car 10 and preferably control operation of the door assemblies of the two gates assemblies 30 on the corresponding side of the car 10. The purpose of each manual actuator or switch 202 through 216 is to provide an open/close directive or signal to the controller 220 for operating one or both door assemblies 74, 76 of a particular gate assembly 30 on the hopper car 10 in response to an operator or maintenance personnel (not shown) manually manipulating or operating the switch or actuator 202 through 208.

In a preferred embodiment, each manual actuator or switch 202 through 216 is identical. Accordingly, only manual actuator or switch 202 will need to be described in detail for a complete understanding thereof Turning to FIG. 14, each manual switch 202 through 216 is preferably designed as a three position toggle switch.

As is conventional, each manual actuator or switch 202 through 216 includes a manually displacable member 203 which is biased toward a center or neutral position. As indicated in phantom lines in FIG. 14, member 203 of each manual actuator or switch 202 through 216 is displacable or movable under the influence of an operator or maintenance personnel to opposite sides of the neutral position.

Figure 14:
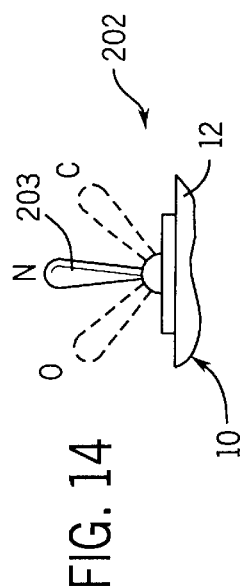
FIG. 14 is a schematic illustration of a manual actuator toggle switch.

With the embodiment illustrated in FIG. 14, when member 203 of a particular manual actuator or switch is moved to the left, an "OPEN" directive or signal is directed to the controller 220 thereby controlling the respective driver for opening the respective door assembly. Alternatively, when member 203 of the manual actuator or switch is moved to the right, a "CLOSE" directive or signal is directed to the controller 220 thereby controlling the respective driver for closing the respective door assembly. Notably, each switch or manual actuator 202 through 216 is configured such that when the influence of an operator or maintenance personnel is removed from the member 203, the switch or manual actuator automatically returns to a neutral or center position and the adjusted position of the respective door assembly controlled thereby remains at that position selected during operation of the switch until further modified by the respective switch or the remote control apparatus 218. As will be appreciated, the switches 202 through 216 can take a myriad of different designs and shapes without detracting or departing from the spirit and scope of the present invention as long as they effect the desired purpose mentioned above.

Figure 15:
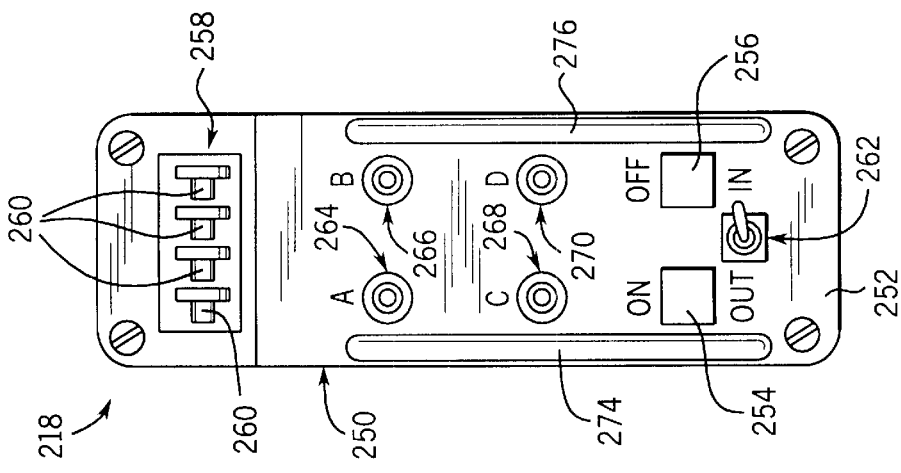
FIG. 15 is a pictorial illustration of a handheld radio transmitter used to remotely control operation of the door assemblies of the gate assembly of the present invention.

Turning to FIG. 15, one form of remote control apparatus 218 is shown as including a handheld transmitter 250 which can be operated by an operator or maintenance personnel (not shown). The purpose of the hand held transmitter 250 is to selectively transmit a coded radio frequency signal to the radio frequency receiver 219 whereby any door assembly 74, 76 of any one of said gate assemblies 30 can be selectively and remotely actuated for movement between the open and closed positions such that ballast from the hopper 12 can be remotely, alternatively discharged from the respective outlets while the railroad car 10 moves along the track bed 25.

In the embodiment illustrated in FIG. 15, the hand held transmitter 250 includes a portable housing 252 which embodies "ON" and "OFF" switches 254 and 256, respectively, for operating the transmitter 250. In the embodiment illustrated in FIG. 15, the hand held transmitter 250 also includes a car selection module 258 including a series of four rotatable dials 260 for dialing in a four digit number associated with a controller 220 on a particular railroad hopper car 10.

In the embodiment illustrated for exemplary purposes in FIG. 15, the hand held transmitter 250 further includes a two-position switch 262. In one position, switch 262 may be set to control or influence movement of only an inner door assembly 74 of any gate assembly 30 on the railroad hopper car 10. In its alternative or second position, switch 262 may be set to control or influence movement of only an outer door assembly 74 of any gate assembly 30 on the railroad hopper car 10. As will be appreciated, the two-position switch 262 can take nay suitable and conventional form without detracting or departing from the spirit and scope of the present invention.

In the embodiment illustrated for exemplary purposes in FIG. 15, the hand held transmitter 250 still furthermore preferably includes four, three position door actuating switches 264, 266, 268 and 270 for opening and closing a selected discharge door assembly 74, 76 of a selected car's four gate assemblies 30 to either the inner side or the outer side of the rails 22, 24 (FIG. 1). The door actuating switches 264 through 270 are substantially similar to the switch 202 discussed above and, thus, no farther details need be provided for a complete and full understanding of how the switches 264 through 270 operate to control the drivers 130, 132 of any particular gate assembly 30. Guard rails 274 and 276 are preferably provided on opposite sides of and extend along the switches 264 through 270 to inhibit inadvertent setting of such switches 264 through 270.

The transmitter 250 is preferably powered by a battery (not shown). Moreover, the transmitter 250 is preferably designed such that if the transmitter 250 is not used to operate any particular door assembly 74, 76 of any gate assembly 30 on a selected car 10 within a predetermined time period, the transmitter 250 automatically shuts itself OFF. In the illustrated embodiment, a time period measuring about 15 consecutive minutes is set before the transmitter 250 will automatically shut itself OFF. As will be appreciated, the hand held transmitter 250 can take a myriad of different designs and shapes without detracting or departing from the spirit and scope of the present invention as long as the transmitter effects the desired purpose mentioned above.

With the car body 12 filled with ballast and transported to a section of railbed undergoing maintenance, the ballast can be selectively distributed to the roadbed below and to either or both sides of the rails 22, 24 simply by operating either the switches 202 through 216 or the remote control apparatus 218. As will be appreciated from an understanding of this invention, both the switches or manual actuators 202 through 216 and the remote control apparatus 218 permit either or both drivers 130, 132 of the gate assemblies on the railcar to be operated either singly or in combination relative to each other.

Actuation of the driver 130 causes the output 168 of the driver 130 to linearly extend thereby effecting rotation of the lever arm 134 mounted to the inner shaft 102. Rotation of the inner shaft 102 is transferred as by the pairs of linkages 90 to effectively pull the inner door assembly 74 open thereby allowing ballast to move through the control opening defined by the position of the door assembly 74 and be deposited to railbed below to an inside of the rail 22, 24. Rotation of the inner shaft 102 through an arc of about 70° will effectively move the door assembly 74 from a fully closed position to a fully open position. One of the many benefits afforded by the present invention is that the driver 130 is reversible such that if too much ballast is being exhausted to the railbed 25 (FIG. 1), the driver 130 can be controlled to push the door assembly 74 toward the closed position until the size of the controlled opening defined by the position of the door assembly 74 relative to the discharge opening 70 is modified to control the amount of ballast flow to the inner side of the rail 22, 24.

Actuation of the driver 132 causes the output 168 of the driver 132 to linearly extend thereby effecting rotation of the lever arm 136 mounted to the outer shaft 112. Rotation of the outer shaft 112 is transferred as by the pairs of linkages 92 to effectively pull the outer door assembly 76 open thereby allowing ballast to move through the control opening defined by the position of the door assembly 76 and be deposited to rail bed 25 below to an outside of the rail 22, 24. Rotation of the outer shaft 112 through an arc of about 70° will effectively move the door assembly 76 from a fully closed position to a fully open position. One of the many benefits afforded by the present invention being that the driver 132 is reversible such that if too much ballast is being exhausted to the rail bed 25 (FIG. 1), the driver 132 can be controlled to push the door assembly 76 toward the closed position until the size of the controlled opening defined by the position of the door assembly 76 relative to the discharge opening 72 is modified to control the amount of ballast flow to the inner side of the rail 22, 24.

Designing the reversible electromechanical drivers 130, 132 for the gate assembly 30 with a direct current electric drive motor 140 offers several benefits over the prior art. First, the electric drive motor 140 is advantageously not susceptible to weather conditions or temperatures. Accordingly, it can be used throughout the United States and other countries with varying temperature ranges and climates. Unlike air or hydraulically operated devices, whose operation is susceptible to temperatures and climates, the direct current electric drive motor 140 powering the drivers 130, 132 of each gate assembly 30 yields reliability and positive operating results regardless of the ambient temperature in which the gate assembly 30 is utilized.

Embodying each driver 130, 132 with an electric motor 140, from which power to operate the various door assemblies 74, 76 of the gate assemblies 30 is derived, is environmentally friendly and eliminates environmental concerns which are inherent with hydraulically operated systems. The use of electric motors in combination with the drivers 130, 132 furthermore eliminates concerns over contamination during repairs to the motors 130, 132 used to move the door assemblies 74, 76.

Second, the size of the direct current electric motor 140 and, thus, the size of the drivers 130, 132 is minimized whereby offering enhanced space as compared with similarly sized gates utilizing air operated drivers. Since the gate assemblies 30 are commonly arranged in a longitudinal direction relative to the railroad cars, any additional space yielded by the minimally sized drivers 130, 132 can be used for additional purposes. Moreover, the minimized size of the drivers 130, 132 reduces the distance separating the lever arms 170, 172 from the end walls 50, 52 of the frame 32 of the gate assembly 30 as compared to gate assemblies utilizing air operated motors.

Advantageously, and although a significant opening force is imparted to each door assembly and each door assembly is moved, preferably at a substantially constant speed of about 2.0 inches per second between closed and open positions, the direct drive electric motor for the drivers 130, 132 each draws less than about 30 amperes from the power source as the respective door assembly is forcibly driven from the closed position to the open position.

The substantially constant speed imparted to each gate assembly 30 by the reversible electric drivers yields advantages to the operator of the gate assembly and/or maintenance personnel. Unlike air or hydraulically operated gate assemblies wherein movements of the door assembly are dependent upon the load placed thereon, the electric drivers 130, 132 of the gate assembly of the present invention yield a substantially constant speed of door movement thereby allowing more precise control over the discharge of material from the car 10 and onto the track bed 25. With the present invention, the operator or maintenance personnel can better judge control over the gate assemblies without concerning themselves with starting or stopping the material flow as a function of the amount of ballast remaining in the hopper and, thus, the load placed upon the gate assembly 30 by such ballast.

Testing has revealed the unique advantage of embodying a gate assembly with drivers 130, 132 which draw less than about 30 amperes from the power source as the respective door assembly moves from the closed position to the open position is very important in areas of the United States such as Seattle, Wash. in December which records the least amount of sunlight per day in the United States. Railroad cars having a gate assembly 30 similar to that of the present invention are often utilized in a 48 hour turn around schedule. Testing and research has further revealed a door assembly will typically be cycled four times during such 48 hour turnaround schedule or period. That is, the inner and outer door assemblies 74, 76, respectively, of each gate assembly 30 will be opened and closed at least four times during the 48 hour period.

Testing has furthermore revealed the advantageously low or relatively small power consumption by the drivers 130, 132 permits the door assemblies 74 and 76 of the gate assembly 30 to be cycled according to the above schedule and from the 24 volt batteries 188 for at least 47 days without requiring recharging of the batteries 188. Such superior performance of the gate assembly 30 is unknown in other systems. Because of the extremely low power consumption used by the drivers 130,132, and in those instances where the batteries 188 are connected to the solar array 190 on each railroad car 10, the system will provide more power than it uses during cycling of the gates 74, 76 of gate assembly 30.

With the present invention, the railcars 10 having the gate assemblies mounted thereon are practically self-sufficient. That is, the railcars utilizing principals of the present invention do not require attachment to locomotives or the like to operate. Accordingly, the long and cumbersome electrical lines or conduits leading from and extending between the locomotive and each hopper car are eliminated. Instead, and with the present invention, each gate assembly 30, along with the drivers 130, 132, can be operated, if required and/or needed, independently of common and heretofore known power sources.

Third, the use of electrically operated drivers 130, 132 for each gate assembly on the rail car 10 has been found to reduce repair time, thus, allowing the railcars to be rapidly returned to service for their intended use rather than sitting in a railyard awaiting repairs or replacement of the drivers for the gate assemblies. Of course, during their useful life and even during repair or replacement of the electric drivers 130, 132, environmental concerns over hydraulic spills are eliminated.

Besides those benefits mentioned above, each driver 130, 132 of gate assembly 30 is protected against overheating by the apparatus 176. As mentioned, when apparatus 176 detects or measures a level of heat beyond a predetermined limit, notwithstanding the cause of such heat, the driver 130, 132 will be disabled thereby protecting the driver 130, 132 from excessive damage which could result in prolonged downtime for the gate assembly 30.

Still further, each driver 130, 132 of gate assembly 30 is protected against damage resulting from limitations on door assembly movements. During operation of the gate assembly 30, one or both of the door assemblies 74, 76 can seize and, for whatever reason, be prevented from further sliding movements. Apparatus 180 advantageously inhibits damage to the drivers 130, 132 resulting from limitations on door assembly movements. Accordingly, the drivers 130, 132 are protected from damage which also could result in costly downtime in repairs and/or replacements.

The reversible drivers 130, 132 for each gate assembly 30 are furthermore protected by the logic circuitry 226 associated with the controller 220. As mentioned above, sending or directing two different signals or open/close directives to the same electric motor can prove detrimental to proper performance of the electric driver and can even result in significant damage thereto. The circuitry or system 226 is provided in combination with the controller 220 thereby allowing only one open/close directive to be sent to the electric motors 130, 132 of a particular gate assembly even when two opposing open/close directives are concurrently directed to either or both of the electric drivers 130, 132 of that particular gate assembly as a result of inadvertent or other actuation of one of the switches 202 through 216 coupled with simultaneous operation of the remote control apparatus 218 to control the same drivers 130, 132.

The modularity of the drivers 130, 132 is also an important feature to the design of the present invention. If, and for whatever reason, either or both of the drivers 130, 132 requires repair and/or replacement, the articulated connection between the clevis 164 and frame 32 along with the articulated connection between the clevis 166 and the respective lever arm 170, 172 is released thereby allowing the applicable modular drive unit to be entirely replaced within minutes rather than hours as is known in conventional structures. As will be appreciated from an understanding of the present invention, the releasable electrical connectors 194 and 196 at opposed ends of the electrical conduit 192 furthermore facilitate repair and/or replacement of the modular drives 130, 132 of the gate assembly 30 as required and/or needed.

In addition to the above, a method for controlling the distribution of ballast to a track bed over which a railroad hopper car moves is also disclosed. The railroad hopper car includes a plurality of discharge outlets on opposed lateral sides of the car and a gate assembly mounted on the hopper in operable association with each discharge outlet for controlling distribution of ballast from the railroad car. Each gate assembly including a movable door assembly and an electro-mechanical reversible driver for moving the door assembly relative to discharge opening between open and closed positions. The method comprises the steps of: controlling the open/close position for the door assembly of each gate assembly and thereby selectively controlling the discharge of material from the hopper car either manually or by remote control, with the manual discharge of ballast from the hopper car involving selectively operating any one or more of a series of manual actuators mounted on the hopper car. With each actuator being capable of providing a first open/close directive to the driver of a respective door assembly thereby allowing for selective movement of the door assembly of a respective gate assembly between the open and closed positions, and with the remote discharge of ballast from the hopper car involving using a radio frequency transmitter for selectively and remotely operating the door assembly of any respective gate assembly in response to transmission of a second open/close directive to the driver for such door assembly of said gate assembly thereby effecting movement of said selected door assembly between the open and closed positions from a location remote from the hopper car such that ballast from the hopper can be remotely, alternatively discharged from said outlets while said railroad car moves along the track bed. The method further includes the step of: providing a controller operably coupled to the manual actuators and responsive to the radio frequency transmitter for controlling movement of each door assembly in response to the open/close directives received from said manual actuators and the radio frequency receiver. The controller including circuitry for inhibiting damage to the electromechanical reversible drivers when two opposing open/close directives are concurrently directed to control a single door assembly from both the manual actuators and the radio frequency transmitter.

From the foregoing it will be observed that numerous modifications and variations can be effected without departing from the true spirit and scope of the novel concept of the present invention. It will be appreciated that the present disclosure is intended to set forth an exemplification of the invention, which is not intended to limit the invention to the specific embodiment illustrated and described. The disclosure is intended to cover by the appended claims all such modification as fall within the spirit and scope of the claims.

What is claimed is:

1. A gate assembly for a railroad hopper car having a hopper body capable of holding ballast therein and defining a hopper bottom outlet positioned between a pair of opposed end panels, said gate assembly comprising:

a frame configured for attachment to said hopper body in surrounding relation relative to said outlet, said frame defining a discharge opening;

a door assembly mounted on said frame for generally vertical and generally linear sliding movements between open and closed positions relative to the discharge opening on said frame; and a driver operably coupled between said frame and said door assembly for imparting up to a 2000 lb. opening force on said door assembly and a speed of about 2.0 inches per second as said door assembly moves from said closed position to said open position, and wherein said driver is powered by a direct current electric motor which draws no more than about 30 amperes from a power source as said door assembly moves from said closed position to said open position.

2. The gate assembly according to claim 1 wherein said power source comprises batteries mounted on said hopper car.

3. The gate assembly according to claim 2 further including an electrical connector having a first releasable connector at that end whereat said electrical connector is operably coupled to said driver and a second releasable connector at the end whereat said electrical connector is operably coupled to said batteries thereby facilitating repair and/or replacement of either said driver or said batteries as required or needed.

4. The gate assembly according to claim 1 further including a solar array mounted on said railroad car and electrically connected to said batteries.

5. The gate assembly according to claim 1 wherein said power source comprises a 24 volt power source.

6. The gate assembly according to claim 1 wherein said frame defines a pair of opposed angularly sloping ledges disposed in generally planar relation relative to each other for supporting opposite sides of said door assembly for sliding movements between the closed and the open positions relative to the discharge opening on said frame.

7. The gate assembly according to claim 6 wherein said door assembly has a generally planar configuration including upper and lower surfaces and further includes slides arranged along a portion of the lower surface of said door, with said slides engaging with the ledges on said frame and which dispose said door assembly at an acute angle relative to the ledges on said frame.

8. The gate assembly according to claim 1 further including a linkage operably disposed between one end of said driver and said door assembly for effecting movements of said door assembly upon linear distention of said driver.

9. The gate assembly according to claim 1 wherein said driver includes a thermal overload apparatus for inhibiting damage to the direct current electric motor resulting from inadvertent overheating of the electric motor.

10. The gate assembly according to claim 1 wherein said driver includes a clutch for inhibiting damage to the driver resulting from limitations on door assembly movements.

11. A railroad hopper car gate assembly, comprising:
a frame defining inner and outer discharge openings;
a pair of door assemblies slidably mounted on said frame, with one door assembly being arranged in operable association with each discharge opening for movement along a generally linear path of travel between open and closed positions, and wherein the paths of travel of the door assemblies are disposed in diverging slanted directions relative to each other; and
with each door assembly being operably connected to a reversible electromechanical driver for effecting sliding movements of an associated door assembly relative to a respective discharge opening between said open and closed positions, and wherein each driver imparts up to a 2000 lb. opening force on said door assembly and a speed of about 2.0 inches per second as said door assembly moves from said closed position to said open position, and wherein each driver includes a direct current electric motor which draws less than about 30 amperes when said door assembly is moved from said closed position to said open position.

12. The gate assembly according to claim 11 wherein each electromechanical driver includes an apparatus for inhibiting damage to said direct current electric motor from heat developed by said motor.

13. The gate assembly according to claim 11 wherein each electromechanical driver includes an apparatus for inhibiting damage to said driver resulting from limitations on door movements.

14. The gate assembly according to claim 11 wherein each electromechanical driver further includes a gear set driven by said direct current electric motor, said gear set including an output gear for rotatably driving a worm gear coupled to an output of said driver.

15. The gate assembly according to claim 14 wherein each electromechanical driver further includes a first housing connected to said motor and arranged in surrounding relation relative to said gear set and a second housing connected to said first housing and arranged in surrounding relation relative to said worm gear.

16. The gate assembly according to claim 15 wherein each electromechanical driver further includes connectors for interconnecting the first housing with the motor and said first and second housings such that the driver is substantially vibration resistant during use of said railroad hopper car.

17. The gate assembly according to claim 15 wherein each electromechanical driver further includes seal structure disposed between said second housing and the output of said driver to allow said electromechanical driver to be angularly disposed relative to said frame as required or needed.

18. The gate assembly according to claim 15 wherein said electromechanical drivers are disposed in substantially common vertical planes relative to each other thereby substantially reducing an overall width of the gate assembly.

19. A railroad hopper car gate assembly, comprising:
a frame configured for attachment in surrounding relation to an opening in a body of a railroad hopper car and including two spaced end walls and a divider panel disposed between said end walls, said frame defining inner and outer outlets disposed to opposite sides of a longitudinal axis of said frame;
inner and outer plate-like door assemblies slidably mounted for generally linear movements on said frame and arranged to open and close the outlets defined by said frame as a function of their disposition relative to their respective outlets; and
a pair of electromechanical drivers operably coupled between said frame and the inner and outer door assemblies, respectively, for positively driving open and positively driving closed said door assemblies relative to their respective outlet, with each electromechanical driver developing up to a 2000 lb. opening force on the door assembly connected thereto and a speed of up to about 2.0 inches per second as said door assembly moves from said closed position to said open position, and wherein each electromechanical driver includes a direct current electric motor which draws less than about 30 amperes from a power source in response to movement of said door assembly from said closed position to said open position.

20. The gate assembly according to claim 19 further including an inner shaft rotatably supported by said frame and disposed to an inner side of a longitudinal axis defined by said frame and an outer shaft rotatably supported by said frame and disposed to an outer side of the longitudinal axis defined by said frame.

21. The gate assembly according to claim 20 wherein a linkage assembly is operably disposed between opposite ends of each inner and outer shaft and the respective inner and outer door assemblies of said gate assembly.

22. The gate assembly according to claim 20 wherein each shaft turns through an arc of approximately 70° as the respective door assembly moved thereby moves between the open and the closed positions.

23. The gate assembly according to claim 19 wherein each electromechanical driver includes an apparatus for inhibiting damage to said direct current electric motor from heat developed by said motor.

24. The gate assembly according to claim 19 wherein each electromechanical driver includes an apparatus for inhibiting damage to said driver resulting from limitations on door assembly movements.

25. The gate assembly according to claim 19 wherein each electromechanical driver further includes a sealed housing to allow said electromechanical driver to be angularly disposed relative to said frame as required or needed.

26. The gate assembly according to claim 19 wherein said electromechanical drivers are disposed in substantially common vertical planes relative to each other thereby substantially reducing an overall width of the gate assembly.

27. A railroad car movable along a railroad trackbed and having a hopper defining a plurality of discharge outlets on opposed lateral sides of said car, comprising:

a gate assembly mounted on said hopper in operable association with each discharge outlet for controlling distribution of ballast from the railroad car, each gate assembly including a movable door assembly and an electromechanical reversible driver for moving said door assembly relative to discharge opening between open and closed positions;

wherein the door assembly of each gate assembly is operated by a manual actuator mounted on said hopper car, with each actuator being capable of providing a first open/close directive to the driver of the door assembly thereby allowing for selective movement of the door assembly of a respective gate assembly between the open and closed positions;

a radio frequency receiver mounted on said car and capable of providing a second open/close directive to the driver of the door assembly thereby allowing for selective movement of the door assembly of a respective gate assembly between the open and closed positions;

a radio frequency transmitter for selectively transmitting a coded radio frequency signal to the radio frequency receiver whereby the door assembly of one of said gate assemblies can be selectively and remotely actuated for movement between the open and closed positions such that ballast from the hopper can be remotely, alternatively discharged from said outlets while said railroad car moves along the track bed; and a controller operably coupled to each manual actuator and said radio frequency receiver for controlling movement of the door assembly in response to the open/close directives received from said manual actuators and said radio frequency receiver, with said controller including circuitry for inhibiting damage to said reversible drivers when two opposing open/close directives are concurrently provided from said manual actuators and said radio frequency receiver.

28. The railroad car according to claim 27 wherein each gate assembly includes two door assemblies slidably movable along predetermined paths of travel and extending in angularly diverging directions relative to each other.

29. The railroad car according to claim 28 wherein said radio frequency transmitter comprises a plurality of manually operated mechanisms, with each mechanism capable of producing a command signal including identifying criteria for indicating which door assembly of which gate assembly is to be operated in response to actuation of a particular mechanism.

30. The railroad car according to claim 27 wherein the manual actuators on said car include a manually operable switch which is biased into a predetermined position.

31. A method for controlling the distribution of ballast to a track bed over which a railroad hopper car moves, said railroad hopper car having a plurality of discharge outlets on opposed lateral sides of said car and a gate assembly mounted on said hopper in operable association with each discharge outlet for controlling distribution of ballast from the railroad car, each gate assembly including a movable door assembly and an electromechanical reversible driver for moving said door assembly relative to discharge opening between open and closed positions, said method comprising the steps of:

controlling the open/close position for the door assembly of each gate assembly and thereby selectively controlling the discharge of material from the hopper car either manually or by remote control, with the manual discharge of ballast from the hopper car involving selectively operating any one or more of a series of manual actuators mounted on said hopper car, with each actuator being capable of providing a first open/close directive to the driver of a respective door thereby allowing for selective movement of the door assembly of a respective gate assembly between the open and closed positions, and with the remote discharge of ballast from the hopper car involving using radio frequency transmitter for selectively and remotely operating the door assembly of any respective gate assembly in response to transmission of a second open/close directive to the driver for such door assembly of said gate assembly thereby effecting movement of said selected door assembly between the open and closed positions from a location remote from the hopper car such that ballast from the hopper can be remotely, alternatively discharged from said outlets while said railroad car moves along the track bed; and providing a controller operably coupled to said manual actuators and responsive to said radio frequency transmitter for controlling movement of the doors in response to the open/close directives received from said manual actuators and said radio frequency transmitter, with said controller including circuitry for inhibiting damage to said electromechanical reversible drivers when two opposing open/close directives are concurrently received by any driver from said manual actuators and said radio frequency transmitter.

32. A railroad car movable along a railroad trackbed and having a hopper defining at least one discharge outlet, comprising:

a gate assembly mounted on said hopper in operable association with said discharge outlet for controlling distribution of ballast from the railroad car, said gate assembly including a movable door assembly and an electromechanical reversible driver for positively moving said door assembly relative to said discharge opening between open and closed positions;

a manually actuated apparatus mounted on said hopper car and operably coupled to said electromechanical reversible driver of said gate assembly, said manually actuated apparatus being capable of providing a first open/close directive to the driver for said door assembly thereby allowing for selective movement of the door assembly between the open and closed positions;

a remote control apparatus operably coupled to said electromechanical reversible driver of said gate assembly, said remote control apparatus being capable of providing a second open/close directive to the driver for said door assembly thereby allowing for selective movement of the door assembly between the open and closed positions from a location remote from said railroad car; and a controller operably coupled to said manually actuated apparatus and to said remote control apparatus for controlling movements of the door assembly in response to the open/close directives received from either said manually actuated apparatus or said remote controlled apparatus, with said controller including circuitry for inhibiting damage to said electro-mechanical reversible driver when one of said manually actuated apparatus and said remote control apparatus is operated to provide a first open/close directive said driver to open/close said door assembly and when the other of said manually actuated apparatus and said remote control apparatus is operated to provide a second open/close directive, opposed to said first open/close directive, to said driver to open/close said door assembly during a time period the first open/close directive is being provided from said one of said manually actuated apparatus and said remote control apparatus to open/close said door assembly.

33. The railroad car according to claim 32 wherein said remote control apparatus comprises a radio frequency receiver mounted on said railroad car and capable of providing the open/close directive to said driver of said door assembly, and a radio frequency transmitter for transmitting a signal from a location remote from said railroad car to the radio frequency receiver whereby allowing for said door assembly to be selectively moved between the closed and open positions under the influence and in response to actuation of the remote control apparatus.

34. The railroad car according to claim 32 wherein said driver for said gate assembly includes a direct current electric motor operably coupled to a power source mounted on said railroad car.

35. The railroad car according to claim 34 wherein said power source comprises batteries mounted on said railroad car.

36. The railroad car according to claim 34 further including a solar array mounted on said railroad car and electrically connected to said power source.

37. The railroad car according to claim 34 wherein said driver includes a thermal overload apparatus for inhibiting damage to the direct current electric motor resulting from inadvertent overheating of the electric motor.

38. The railroad car according to claim 34 wherein said driver includes a clutch for inhibiting damage to the driver resulting from limitations on door assembly movements.

39. The railroad car according to claim 34 wherein said electromechanical driver further includes a sealed housing to allow said electromechanical driver to be angularly disposed relative to a horizontal plane.

* * * * *